UNITED STATES PATENT OFFICE.

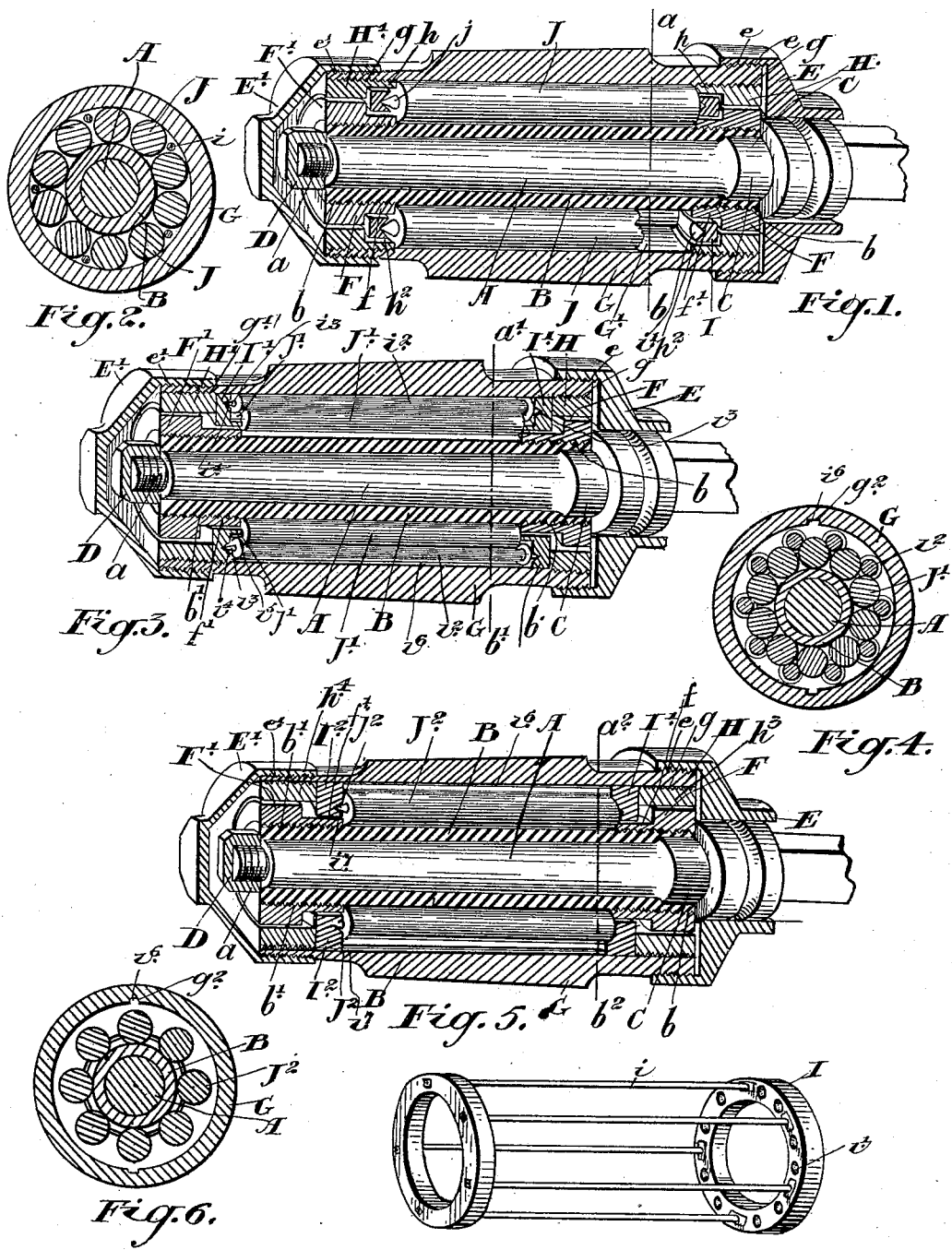

ALBERT ENNIS HENDERSON, OF WOODBRIDGE, CANADA, ASSIGNOR TO THE TORONTO ROLLER BEARING COMPANY, LIMITED, OF TORONTO, CANADA, A CORPORATION OF ONTARIO.

ROLLER-BEARING.

SPECIFICATION forming part of Letters Patent No. 686,403, dated November 12, 1901.

Application filed December 4, 1900. Serial No. 38,688. (No model.)

*To all whom it may concern:*

Be it known that I, ALBERT ENNIS HENDERSON, clergyman, of the village of Woodbridge, in the county of York, in the Province of Ontario, Canada, have invented certain new and useful Improvements in Roller-Bearings, of which the following is a specification.

My invention relates to improvements in roller-bearings; and the object of the invention is to produce a roller-bearing in which the friction will be reduced to a minimum and which is capable of a ready and accurate adjustment; and it consists, essentially, of an outer sleeve and an inner sleeve secured on the axle-arm or rotating part by internal nuts, the inner sleeve fitting such axle or rotating part and having situated peripherally outside of same an annular recess, and, further, of rollers provided with conical reduced ends, which have their bearings in a corresponding form of recess in rings situated at each end of the rollers and located in the annular recess, the parts being arranged and constructed in detail as hereinafter more particularly explained.

Figure 1 is a sectional perspective view of my preferred form of roller-bearing, showing the outer sleeve as the rotary part. Fig. 2 is a cross-section on the line $ab$ through Fig. 1. Fig. 3 is an alternative form. Fig. 4 is a cross-section on the line $a'b'$ of Fig. 3. Fig. 5 is an alternative form. Fig. 6 is a cross-section on the line $a^2 b^2$, Fig. 5. Fig. 7 is a detail of the ring-cage shown in Fig. 1.

In the drawings like letters of reference indicate corresponding parts in each figure.

A is the arm of an ordinary axle, which in this instance is supposed to be stationary, and B is a tapered sleeve which fits said tapered arm, being held against the shoulder C by means of the end nut D fitting on the reduced end $a$ of the arm A.

E is the inner dust-cap, which is internally threaded at $e$, as shown.

F and F' are external collars or nuts, which are fitted over the threaded ends $b$ and $b'$ of the tapered sleeve B, respectively.

G is the external sleeve or rotating part in this instance, which is screwed at one end into the internal thread $e$ in the dust-cap E and at the opposite end into the internal thread $e'$ of the end dust-cap E'.

H and H' are internal nuts or collars, which are externally threaded and fit into the internal threads $g$ and $g'$, respectively, located at the ends of the sleeve G.

It will be noticed that the nuts F and F' and H and H' are provided with the interior flanges $ff'$ and $hh'$, respectively, which form shoulders whereby the minor annular end recesses $h^2$ are provided, as indicated. Within these recesses are located the end rings I, which are connected together by the cross-rods $i$, so as to form a cage. On the interior faces of the rings I I, I provide the conical recesses $i'i'$.

J indicates rollers, which are provided with th econical reduced ends $j$, which extend into the broader conical recesses $i'$, so that the apex of the conical reduced ends $j$ fits into the broader apex of the recesses $i'$, thus keeping the rollers J from contact with each other and at the same time minimizing the friction on the ends of such rollers. The outer ends of the rollers J are located in close proximity to the ends of the flanges $ff'$ and $hh'$, respectively.

The sleeve or rotating part G may form or be fitted into the hub of the wheel of a vehicle, and therefore rotate upon the roller-bearings constructed and arranged in the annular recess G', peripherally outside the sleeve B, or as an alternative the rotating part may be the axle A and its sleeve B, and the stationary part or boxing may be the sleeve G. It is of course not essential as to which part rotates; but in either case it will be seen that from the construction that I have described the rollers are kept separated from each other in a simple manner, and the grinding action on the end of the rollers is practically eliminated on account of the peculiar construction of the reduced tapered ends fitted into the broader tapered recesses, which I have described.

In Figs. 3 and 4 I show an alternative form, in which I provide the end rings I' I' without any connecting cross-rods I. I provide instead, however, separate minor rollers $i^2$, which have reduced conical ends $i^3$, which fit into broader conical recesses $i^4$ in the rings I'. The rollers J' in this case I preferably provide with end pintles $j'$, which are located outside the flange $i^5$ of the rings I, and thereby the rollers are held in place as well as separated. In this case also the rings I' are stationary in relation to the sleeve G and are provided with diametrical projections $i^6$, which fit into the corresponding longitudinal grooves $g^2$ in the sleeve G, so as to hold such ring rigid with the sleeve G. The bearing of the rollers J' in this case is removed from the internal periphery of the sleeve G onto the rollers $i^2$.

In Fig. 5 I show another alternative form, in which I provide end rings $I^2$, which are held in place by the internal nuts $h^3$ and $h^4$, which abut the outer faces of the rings $I^2$, as shown. The bearing-rollers $J^2$ in this case have conical reduced ends $j^2$, which fit into broader conical recesses $i^7$, as indicated, the conical recesses $i^7$ being situated concentrically closer to the center in the rings $I^2$ as compared with the recesses in the rings I in Fig. 3, thereby throwing the rollers at the outside away from the interior of the sleeve G, but radially upon the sleeve B, upon which the bearing in this case is made.

In the three forms described it will be noticed that the same essential characteristics are maintained, and it may be possible also to still further vary the forms without departing from the spirit of my invention.

What I claim as my invention is—

1. The combination with the arm or axle and the sleeve fitting thereon and provided with threaded ends and means for holding the sleeve in position, and the external sleeve or rotating part provided with the end internal threads, the end collars or nuts fitted onto each threaded end of the internal sleeve and provided with inwardly-extending flanges, the end collars or nuts fitting within each end of the external sleeve and provided with inwardly-extending flanges, and forming with the flanges on the collars of the nuts fitting on the internal sleeve end annular recesses, of the rollers fitting between the inner flanges of the nuts and circumferentially between the sleeves and provided with conical reduced ends and the end rings fitting within the end annular recesses and provided with broad conical recesses to receive the points of the conical reduced ends of the rollers and means for holding the end rings from spreading from each other as and for the purpose specified.

2. The combination with the arm or axle and the sleeve fitting thereon and provided with threaded ends and means for holding the sleeve in position, and the external sleeve or rotating part provided with the end internal threads, the end collars or nuts fitted onto each threaded end of the internal sleeve and provided with inwardly-extending flanges, the end collars or nuts fitting within each end of the external sleeve and provided with inwardly-extending flanges, and forming with the flanges on the collars of the nuts fitting on the internal sleeve end annular recesses, of the rollers fitting between the inner flanges of the nuts and circumferentially between the sleeves and provided with conical reduced ends, and the end rings fitting within the end annular recesses and provided with broad conical recesses to receive the points of the conical reduced ends of the rollers, means for holding the end rings from spreading from each other and the dust-caps internally threaded and fitted onto the externally-threaded ends of the outer sleeve as and for the purpose specified.

3. The combination with the arm or axle and the sleeve fitting thereon and the external sleeve and rotating part, of the external nuts or collars secured on the ends of the internal sleeve and the opposing internal nuts or collars secured in the ends of the external sleeve and the friction-rollers occupying the annular space between the end nuts or collars and abutting the same whereby the sleeves are kept in proper relative position longitudinally as specified.

ALBERT ENNIS HENDERSON.

Witnesses:
B. BOYD,
L. BLACKMORE.